Patented Apr. 12, 1927.

UNITED STATES PATENT OFFICE.

FREDERICK L. DUNLAP, OF CHICAGO, ILLINOIS, AND NATHANIEL T. EWER, OF SWARTHMORE, PENNSYLVANIA, ASSIGNORS TO AMDYCO CORPORATION, OF NEW YORK, N. Y., A CORPORATION OF NEW YORK.

FIRE-EXTINGUISHING COMPOSITION.

No Drawing. Application filed April 21, 1926. Serial No. 103,631.

This invention relates to fire-extinguishing compositions, and particularly to compositions including the ingredients necessary to produce a stable and tenacious foam when the composition is combined with water.

The use of foam for fire-extinguishing purposes, especially for oil fires, is well known. The commercial systems heretofore in use have depended upon the storage of solutions containing respectively materials such as sodium bicarbonate and aluminum sulphate, one of the solutions having in addition a stabilizing ingredient such as an extract of licorice or of oak bark or some other material intended to increase the surface tension of the water films which surround the gas bubbles in the foam. Such systems have the defect that the supply of foam depends upon the capacity of the tanks which are expensive to install and maintain. The solutions are, moreover, subject to deterioration in storage.

Compositions including all of the necessary ingredients to produce foam when the composition is combined with water have also been suggested, and a method of producing foam continuously from such compositions is described in the application of Walter Palmer, Serial No. 23,266. The composition may consist, for example, of sodium bicarbonate, aluminum sulphate and a suitable stabilizer as above described in a dry and relatively finely divided condition. Such a composition can be fed to a stream of water and upon contact therewith will produce a satisfactory foam.

The value of any fire-extinguishing medium depends upon its availability when a fire occurs and often the medium remains in storage for long periods when it is not needed. We have investigated dry fire-extinguishing compositions containing materials such as sodium bicarbonate and aluminum sulphate with a stabilizing ingredient and have found that they are subject sometimes to decomposition in storage and that they are not, therefore, entirely reliable.

The aluminum sulphate of commerce often has the formula $Al_2(SO_4)_3 \cdot 18H_2O$, that is to say, it carries eighteen molecules of water of crystallization. Another commercial form of aluminum sulphate contains fourteen molecules of water of crystallization. There is also usually present in the materials used in the composition a trace of uncombined water which is capable of initiating a reaction between aluminum sulphate and sodium bicarbonate. If water of crystallization is present in the aluminum sulphate more free water is liberated by the reaction which is thereby propagated progressively throughout the mass. The possibility of such a reaction could be avoided by substantially complete dehydration, that is, the removal of free and combined water from the materials of the composition and particularly from the aluminum sulphate. A new difficulty is introduced, however, because the anhydrous salt is not sufficiently soluble to react with the required speed when the composition is added to a flowing stream of water.

It is the object of the invention to provide compositions for fire-extinguishing use in which the several factors affecting the speed of reaction and the keeping quality of the product are so correlated as to produce the most efficient agent.

Other objects and advantages of the invention will be apparent as it is better understood by reference to the following specification in which the preferred embodiments are described.

We have discovered that the speed of reaction between the ingredients of the composition when it is mingled with water can be accelerated materially by reducing the sizes of the particles of which it is composed. The aluminum sulphate used heretofore in such compositions contains a large proportion of particles which will not pass a forty mesh sieve. Such particles dissolve slowly and are, therefore, ineffective. By reducing the sizes of the particles or by eliminating those which do not pass a forty mesh sieve the reaction is made more active.

The disadvantage of partially dehydrated materials can be overcome, therefore, by reducing the sizes of the particles to a point at which the increased rate of solubility due to the finer state of subdivision balances the loss of solubility resulting from the removal of water. Thus, it is possible to remove water of crystallization from the aluminum sulphate to the extent that only about seven molecules remain and to produce a sufficiently reactive composition with this material if the particle sizes in the composition are below forty mesh.

We have also discovered that the tendency of the ingredients of the composition to react prematurely can be overcome by the addition of an inert material to the composition. The function of this inert material is to separate the particles of the ingredients which can react. The addition of inert material reduces the gas-forming capacity of the composition per unit of weight thereof and consequently lowers the efficiency of the material. If, however, a portion of the water of crystallization is removed from the aluminum sulphate a smaller proportion thereof by weight is required to complete the reaction with the sodium bicarbonate. In this case the inert material is substituted for the water of crystallization and the total gas-forming capacity of the composition can be maintained because the reacting ingredients constitute substantially the same proportion of the total weight of the composition. The effect of the removal of water of crystallization upon the speed of the reaction can be overcome as hereinbefore indicated by reducing the particle sizes so that the particles will pass a forty mesh sieve. We can, therefore, by suitably proportioning the amount of water of crystallization and the particle sizes, produce a composition containing from approximately 8 or 9% to 32 to 35% of inert material by weight. Such compositions are stable and do not deteriorate in storage because of the protection afforded by the inert material and by the reduced water content or both. The compositions are, however, sufficiently reactive to produce foam rapidly and efficiently when water is mingled therewith.

The composition may contain aluminum sulphate with fourteen molecules of water of crystallization if inert material is added in suitable proportion. We find it desirable, however, as hereinbefore indicated, to reduce the water content of the aluminum sulphate and water of crystallization may be removed until the aluminum sulphate contains not more than seven molecules thereof. This material is sufficiently soluble for the purpose of the invention if the particle size is below forty mesh.

We prefer, therefore, to prepare compositions containing the necessary ingredients with as little water of crystallization as is practicable in view of the necessity for rapid solution and to accelerate the solution of the materials by reducing the size of the particles. We also prefer to add to the composition as large a proportion of inert material as is possible to protect the material from spontaneous decomposition.

As the active reacting ingredients of the composition, we prefer to employ aluminum sulphate and sodium bicarbonate. These materials are readily obtainable in commerce and they can be obtained in suitable condition or can be reduced readily to that condition. The aluminum sulphate may, as hereinbefore indicated, contain fourteen molecules of water of crystallization, but it is preferable to remove some of this water of crystallization down to approximately seven molecules. A further reduction in the water content of the aluminum sulphate tends to render it relatively insoluble even when it is in a finely divided condition. Both of the reacting ingredients should have a particle size not exceeding forty mesh, that is to say, any material which does not pass a forty mesh sieve should be rejected. All or a large part of the material may be in a very much finer condition. Generally speaking, the finer the material the more rapidly it will be dissolved and consequently the reaction will be correspondingly accelerated when the material is added to water for the purpose of producing foam.

As a stabilizing ingredient we may utilize extract of licorice, or extract of oak bark as described in the patent to Ewer, No. 1,527,509, or any other material which can be added for the purpose of increasing the tenacity of the foam. The usual extracts can be concentrated by evaporation to produce a dry material, which, in finely divided condition, can be added to and mixed with the reacting ingredients. The size of the particles of the stabilizing ingredient should not be greater than the particle size of the other ingredients of the composition.

As an inert filler we may employ organic products such as starch or flour, or inorganic materials such as china clay or talc. A large variety of inert materials having the general characteristics of the materials mentioned are available. We prefer clay because it is readily procurable in a satisfactory form and it can be readily dried and mixed with the other ingredients of the composition.

As examples of compositions embodying the invention the following may be considered satisfactory although the first composition is less stable than the others because of the relatively limited amount of inert material and the relatively high proportion of water of crystallization which it contains. It can be improved by reducing the water content of the aluminum sulphate and by increasing the amount of inert material.

| | Parts by weight |
|---|---|
| Aluminum sulphate (14 molecules of water of crystallization) | 55 |
| Sodium bicarbonate | 39 |
| Stabilizer | 6 |
| Starch | 10 |

The following example indicates the preferred composition:

| | Parts by weight. |
|---|---|
| Aluminum sulphate (7 molecules of water of crystallization) | 35 |
| Sodium bicarbonate | 39 |
| Stabilizer | 6 |
| China clay | 30 |

The several ingredients of the composition set forth are reduced to the proper particle size, that is to say, all particles which do not pass a forty mesh sieve are rejected and the ingredients are then thoroughly mingled until the composition is substantially uniform. The product should then be packed in sealed containers from which the moisture of the atmosphere is excluded. When so preserved the compositions will remain substantially indefinitely in their original condition. The compositions may be utilized at any time by adding them in proper proportion to water and especially by applying them in accordance with the method of the Palmer application hereinbefore identified in which the composition is drawn into the stream of water by the effect of suction applied at the point of entrance of the powdered material to the stream. When the compositions are thus mixed with water the reaction between the ingredients produces foam immediately. The pressure caused by the gas developed during the reaction is sufficient to eject the foam from the apparatus in which it is produced. A suitable hose or other connection may be employed to direct the foam upon the surface to be protected.

It is to be understood that the examples of the compositions as herein set forth are illustrative merely and that the invention is not restricted thereto. Other combinations including changes in the materials and variations of the proportions may afford the advantages of the invention. Various changes may be made, therefore, within the scope of the accompanying claims without departing from the invention or sacrificing the advantages thereof.

We claim:—

1. A fire-extinguishing composition comprising ingredients capable of reacting in the presence of water to produce foam, a foam stabilizer and inert material to avoid deterioration of the composition in storage.

2. A fire-extinguishing composition comprising ingredients capable of reacting in the presence of water to produce foam, a foam stabilizer and inert material to avoid deterioration of the composition in storage, the size of the particles of the reacting ingredients being such as to accelerate the reaction.

3. A fire-extinguishing composition comprising ingredients capable of reacting in the presence of water to produce foam, a foam stabilizer and from 8 to 35% of an inert material to avoid deterioration of the composition in storage.

4. A fire-extinguishing composition comprising ingredients capable of reacting in the presence of water to produce foam, a foam stabilizer and an inert material to avoid deterioration of the composition in storage, the sizes of the particles of the reacting ingredients being such as to pass a forty mesh sieve.

5. A fire-extinguishing composition comprising ingredients capable of reacting in the presence of water to produce foam, a foam stabilizer and from 8 to 35% of an inert material to avoid deterioration of the composition in storage, the sizes of the particles of the reacting ingredients being such as to pass a forty mesh sieve.

6. A fire-extinguishing composition comprising ingredients capable of reacting in the presence of water to produce foam, one of the ingredients including water of crystallization, a stabilizing agent and an amount of inert material sufficient to retard the tendency for the water of crystallization to cause a spontaneous reaction between the ingredients.

7. A fire-extinguishing composition comprising ingredients capable of reacting in the presence of water to produce foam, one of the ingredients including water of crystallization, a stabilizing agent and an amount of inert material sufficient to retard the tendency for the water of crystallization to cause a spontaneous reaction between the ingredients, the amount of water of crystallization being reduced sufficiently to permit the addition of the necessary proportion of inert material.

8. A fire-extinguishing composition comprising aluminum sulphate containing not more than fourteen molecules of water of crystallization, an ingredient capable of reacting therewith in the presence of water, a stabilizer and an inert material.

9. A fire-extinguishing composition comprising aluminum sulphate containing not more than fourteen molecules of water of crystallization, an ingredient capable of reacting therewith in the presence of water, a stabilizer and from 8 to 35% of an inert material.

10. A fire-extinguishing composition comprising aluminum sulphate containing not more than fourteen molecules of water of crystallization, an ingredient capable of reacting therewith in the presence of water, a stabilizer and an inert material, the sizes of the particles of the reacting ingredients being such as to pass a forty mesh sieve.

11. A fire-extinguishing composition comprising aluminum sulphate containing not more than fourteen molecules of water of crystallization, an ingredient capable of reacting therewith in the presence of water, a stabilizer and from 8 to 35% of an inert material, the sizes of the particles of the reacting ingredients being such as to pass a forty mesh sieve.

12. A fire-extinguishing composition comprising aluminum sulphate, sodium bicarbonate, a foam stabilizer and an inert material to avoid deterioration of the composition in storage.

13. A fire-extinguishing composition comprising aluminum sulphate, sodium bicarbonate, a foam stabilizer and from 8 to 35% of an inert material to avoid deterioration of the composition in storage.

14. A fire-extinguishing composition comprising aluminum sulphate, sodium bicarbonate, a foam stabilizer and an inert material to avoid deterioration of the composition in storage, the size of the particles of aluminum sulphate and sodium carbonate being such as to pass a forty mesh sieve.

15. A fire-extinguishing composition comprising aluminum sulphate, sodium bicarbonate, a foam stabilizer and from 8 to 35% of an inert material to avoid deterioration of the composition in storage, the size of the particles of aluminum sulphate and sodium bicarbonate being such as to pass a forty mesh sieve.

In testimony whereof we affix our signatures.

FREDERICK L. DUNLAP.
NATHANIEL T. EWER.